United States Patent
Otani

(10) Patent No.: US 11,772,425 B2
(45) Date of Patent: Oct. 3, 2023

(54) PNEUMATIC TIRE

(71) Applicant: SUMITOMO RUBBER INDUSTRIES, LTD., Kobe (JP)

(72) Inventor: Masafumi Otani, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 295 days.

(21) Appl. No.: 17/122,554

(22) Filed: Dec. 15, 2020

(65) Prior Publication Data

US 2021/0094355 A1 Apr. 1, 2021

Related U.S. Application Data

(62) Division of application No. 16/212,324, filed on Dec. 6, 2018, now Pat. No. 11,318,793.

(30) Foreign Application Priority Data

Jan. 30, 2018 (JP) .................. 2018-013903

(51) Int. Cl.
  *B60C 9/18* (2006.01)
  *B60C 9/26* (2006.01)
  *B60C 9/20* (2006.01)

(52) U.S. Cl.
  CPC .............. *B60C 9/1807* (2013.01); *B60C 9/18* (2013.01); *B60C 9/20* (2013.01); *B60C 9/263* (2013.01);

(Continued)

(58) Field of Classification Search
  CPC .................. B60C 9/263; B60C 9/1807; B60C 2009/1814; B60C 9/1821; B60C 2009/2032; B60C 2009/2035

See application file for complete search history.

(56) References Cited

U.S. PATENT DOCUMENTS 3,720,569 A 3/1973 Kimble
2016/0271895 A1 9/2016 Otani

FOREIGN PATENT DOCUMENTS

DE         2162402    * 10/1972
DE    102004029987   *  1/2006

(Continued)

OTHER PUBLICATIONS

Machine translation of DE 2162402, 1972.*
Extended European Search Report for European Application No. 18201458.9, dated Mar. 7, 2019.

*Primary Examiner* — Justin R Fischer

(74) *Attorney, Agent, or Firm* — Birch, Stewart, Kolasch & Birch, LLP

(57) ABSTRACT

A pneumatic tire has a tread reinforcing layer comprising a net structure formed from a tape of rubber coated reinforcing cord(s). The net structure comprises first oblique segments and second oblique segments of the tape which intersect with each other, forming interspaces therebetween. The first oblique segment has a first axial outer part in which the angle of the tape with respect to the tire circumferential direction decreases toward one end in the tire axial direction of the net structure. The second oblique segment has a second axial outer part in which the angle of the tape with respect to the tire circumferential direction decreases toward the above-said one end of the net structure. The first axial outside part is connected to the second axial outside part directly or through a circumferential segment of the tape.

8 Claims, 9 Drawing Sheets

(52) U.S. Cl.
CPC .. *B60C 2009/2035* (2013.01); *B60C 2200/10* (2013.01)

(56) References Cited

FOREIGN PATENT DOCUMENTS

| | | | |
|---|---|---|---|
| EP | 2199106 A1 | | 6/2010 |
| EP | 3069862 A1 | | 9/2016 |
| EP | 3225427 A1 | | 10/2017 |
| GB | 1309693 | * | 3/1973 |
| JP | 5-139115 | * | 6/1993 |
| JP | 2015-107563 A | | 6/2015 |
| KR | 2004-0036839 | * | 5/2004 |
| WO | WO 88/03481 A1 | | 5/1988 |

* cited by examiner

PNEUMATIC TIRE

CROSS-REFERENCE TO RELATED APPLICATIONS

This application is a Divisional of copending application Ser. No. 16/212,324, filed on Dec. 6, 2018, which claims priority under 35 U.S.C. § 119(a) to Application No. 2018-013903, filed in Japan on Jan. 30, 2018, all of which are hereby expressly incorporated by reference into the present application.

TECHNICAL FIELD

The present invention relates to a pneumatic tire, more particularly to a tread reinforcing layer.

BACKGROUND ART

The following Patent Document 1 describes a pneumatic tire with a tread reinforcing layer disposed in a tread portion. This tread reinforcing layer comprises first oblique segments, second oblique segments and parallel segments formed by a long continuous tape having reinforcing cords. In the first oblique segments, the tape is inclined with respect to the tire circumferential direction to one side in the tire axial direction. In second oblique segments, the tape is inclined with respect to the tire circumferential direction to the other side in the tire axial direction. In the parallel segments, the tape extends parallel with the tire circumferential direction. The parallel segments connect between the first and second oblique segments.

In such tread reinforcing layer, due to the existence of the parallel segments, the bending angle of the tape, namely, the angle between the oblique segments and the parallel segments, is increased, and the bending stress of the reinforcing cords becomes reduced. Therefore, in the pneumatic tire of Patent Document 1, the bonding strength between the reinforcing cords and the underlying structure such as the carcass can be maintained at high level, and the windings or turns of the tape can be suppressed from being disturbed.

Patent Document 1: Japanese Patent No. 5918742

SUMMARY OF THE INVENTION

Problems to be Solved by the Invention

In recent years, on the other hand, in order to improve the cornering performance and the productivity of such a tire, there is a demand for the tire in which the disturbance or disorder of the windings of the tape is most surely prevented.

The present invention was made in view of the above circumstances, and its main object is to provide a pneumatic tire in which windings of a tape can be most surely prevented from being disturbed.

According to one aspect of the present invention, a pneumatic tire comprises:
 a tread portion whose outer surface defines the tread,
 a pair of sidewall portions,
 a pair of bead portions,
 a carcass extending between the bead portions through the tread portion and the sidewall portions, and
 a tread reinforcing layer disposed radially outside the carcass in the tread portion, and comprising a net structure formed from a tape of topping rubber in which a single reinforcing cord or plural reinforcing cords are embedded along the length of the tape,
wherein
 the net structure comprises
 two or more first oblique segments in which the tape is inclined with respect to the tire circumferential direction to one side in the tire axial direction, and
 two or more second oblique segments in which the tape is inclined with respect to the tire circumferential direction to the other side in the tire axial direction,
 side edges of the first oblique segments do not contact with each other,
 side edges of the second oblique segments do not contact with each other, and
 the first oblique segments and the second oblique segments intersect with each other, forming interspaces therebetween,
wherein
 each of the first oblique segments has a first axial outer part in which the angle of the tape with respect to the tire circumferential direction decreases toward one end in the tire axial direction of the net structure, and
 each of the second oblique segments has a second axial outer part in which the angle of the tape with respect to the tire circumferential direction decreases toward the above-said one end in the tire axial direction of the net structure, and
 the above-said first axial outside part is connected to the above-said second axial outside part through a circumferential segment in which the tape extends in the tire circumferential direction.

It is preferable that the above-said each of the first oblique segment has another first axial outer part in which the angle of the tape with respect to the tire circumferential direction decreases toward the other end in the tire axial direction of the net structure, and
 the above-said each of the second oblique segments has another second axial outer part in which the angle of the tape with respect to the tire circumferential direction decreases toward the above-said other end in the tire axial direction of the net structure, and
 the above-said another first axial outside part is connected to the above-said another second axial outside part through another circumferential segment in which the tape extends in the tire circumferential direction.

It is preferable that the circumferential length of the above-said circumferential segment is 1/N times the circumferential length of the tread reinforcing layer measured at the axial position of the above-said circumferential segment, wherein "N" is the number of the first oblique segments.

According to another aspect of the present invention, a pneumatic tire comprises:
 a tread portion whose outer surface defines the tread,
 a pair of sidewall portions,
 a pair of bead portions,
 a carcass extending between the bead portions through the tread portion and the sidewall portions, and
 a tread reinforcing layer disposed radially outside the carcass in the tread portion, and comprising a net structure formed from a tape of topping rubber in which a single reinforcing cord or plural reinforcing cords are embedded along the length of the tape,
wherein
 the net structure comprises two or more first oblique segments in which the tape is inclined with respect to the tire circumferential direction to one side in the tire axial direction, and two or more second oblique segments in which the tape is inclined with respect to the tire circumferential direction to the other side in the tire axial direction, side edges of the first oblique segments do not contact with each other, side edges of the second oblique segments do not contact with each other, and the first oblique segments and the second oblique segments intersect with each other, forming interspaces therebetween.

wherein each of the first oblique segments has a first axial outer part in which the angle of the tape with respect to the tire circumferential direction decreases toward one end in the tire axial direction of the net structure, and each of the second oblique segments has a second axial outer part in which the angle of the tape with respect to the tire circumferential direction decreases toward the above-said one end in the tire axial direction of the net structure, and the above-said first axial outside part is directly connected to the above-said second axial outside part.

It is preferable that the above-said each of the first oblique segments has another first axial outer part in which the angle of the tape with respect to the tire circumferential direction decreases toward the other end in the tire axial direction of the net structure, the above-said each of the second oblique segments has another second axial outer part in which the angle of the tape with respect to the tire circumferential direction decreases toward the above-said other end in the tire axial direction of the net structure, and the above-said another first axial outside part is directly connected to the above-said another second axial outside part.

In the first axial outer part and the second axial outer part in the former two embodiments, the angle of the tape with respect to the tire circumferential direction may be changed stepwise.

In the first axial outer part and the second axial outer part in the former two embodiments, the angle of the tape with respect to the tire circumferential direction may be continuously changed.

In the former two embodiments, it is preferable that the axial length of the first axial outer part is smaller than the axial length of the adjacent interspace, and the axial length of the second axial outer part is smaller than the axial length of the adjacent interspace.

The pneumatic tire according to the present invention is suitable embodied as a motorcycle tire in which the tread portion is convexly curved so that the maximum cross sectional width of the tire occurs between the tread edges.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like.

DESCRIPTION OF THE PREFERRED EMBODIMENTS

Embodiments of the present invention will now be described in detail with reference to the accompanying drawings.

Figure 1:
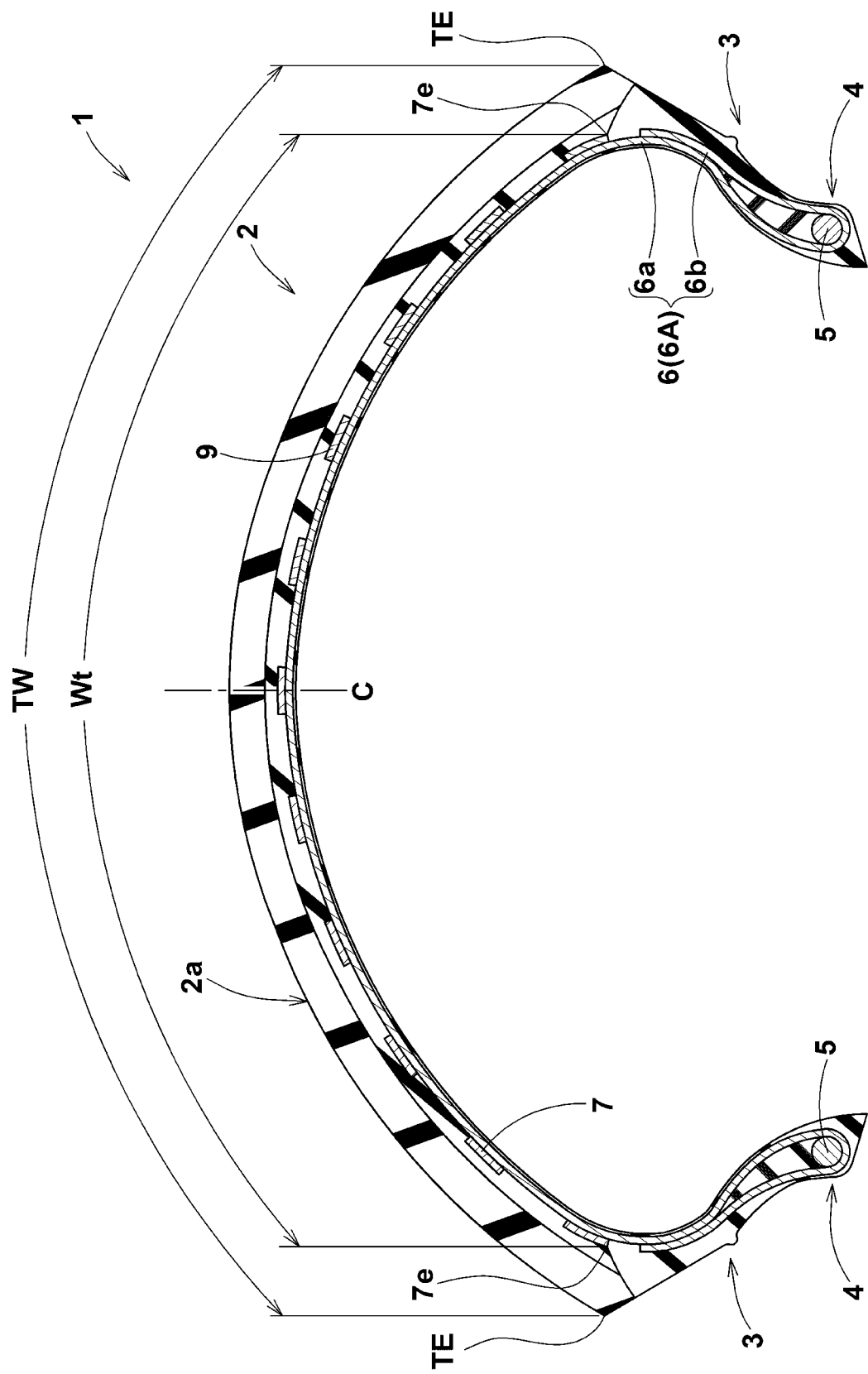
FIG. 1 is a cross-sectional view of a motorcycle tire as an embodiment of the present invention.

FIG. 1 is a cross-sectional view of a pneumatic tire 1 as an embodiment of present invention under its normally inflated unloaded condition of the tire.

In this embodiment, the pneumatic tire 1 is a motorcycle tire. The present invention, however, can be applied to pneumatic tires in other categories, e.g. passenger car tires, heavy duty tires and the like.

As shown in FIG. 1, the pneumatic tire 1 comprises a tread portion 2 having a tread surface 2a,
a pair of sidewall portions 3,
a pair of bead portions 4 each with a bead core therein,
a carcass 6 extending between the bead portions 4 through the tread portion 2 and the sidewall portions 3, and
a tread reinforcing layer 7 disposed radially outside the carcass 6 in the tread portion 2.

In this embodiment, as a characteristic of a motorcycle tire, the tread portion 2 (inclusive of the carcass 6, tread reinforcing layer 7 and a tread rubber thereon) is convexly curved so that the tread face between the tread edges TE is curved like an arc swelling radially outwardly, and the maximum cross sectional width of the tire 1 occurs between the tread edges TE.

The carcass 6 is composed of at least one ply 6A of rubberized cords arranged at an angle of 75 to 90 degrees with respect to the tire equator C, extending between the bead portions 4 through the tread portion 2 and the sidewall portions 3, and turned up around the bead core 5 in each of the bead portions 4 so as to have a pair of turned up portions 6b and a main portion 6a therebetween.

In the tire meridian section, the tread reinforcing layer 7 extends convexly along the tread surface 2a over substantially the entire width of the tread portion 2 to increase the rigidity of the tread portion 2 over the entire width of the tread portion 2.
Preferably, the width wt of the tread reinforcing layer 7 between its axially outer edges 7e measure axially in parallel with the tread surface 2a is set in a range from 75% to 95% of the developed tread width TW measured along the tread surface 2a between the tread edges TE of the tread portion 2.

The tread reinforcing layer 7 is formed by a long tape 9, and in this embodiment, the tape is wound around on the carcass 6. Namely, the tread reinforcing layer 7 is windings or turns of the tape.

Figure 2:
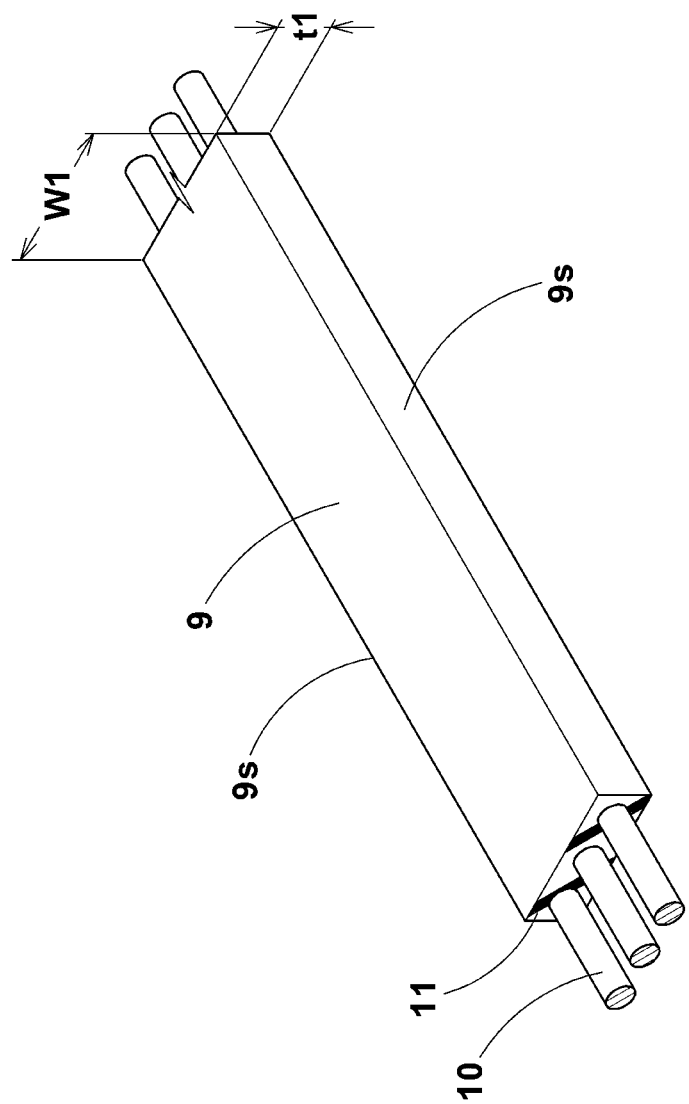
FIG. 2 is an enlarged schematic perspective partial view of a tape forming the tread reinforcing layer.

FIG. 2 shows a part of an example of the tape 9. In this example, the tape 9 has a substantially rectangular cross-sectional shape, and has side edges 9s extending in the longitudinal direction thereof. Preferably, the width W1 between the side edges 9s is set in a range from 2.5 to 12.0 mm, and the thickness t1 is set in a range from 0.6 to 3.0 mm.

The tape 9 is formed by covering a single reinforcing cord or plural parallel reinforcing cords 10 with a topping rubber 11.
As the reinforcing cords 10, a steel cord or an organic fiber cord can be used.

Figure 3:
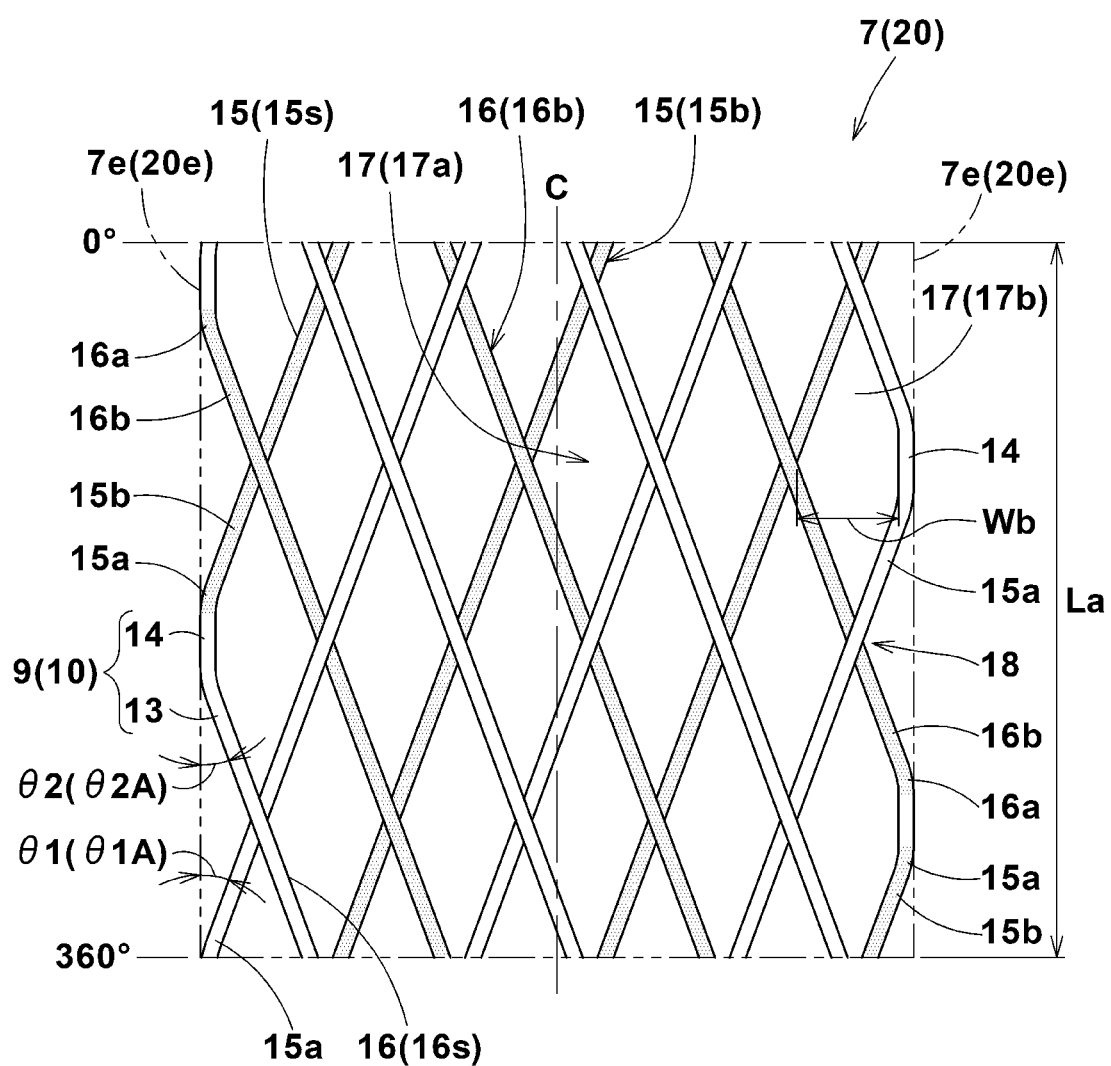
FIG. 3 is a developed view showing an example of the tread reinforcing layer which is scaled down only in the tire circumferential direction.
Figure 5:
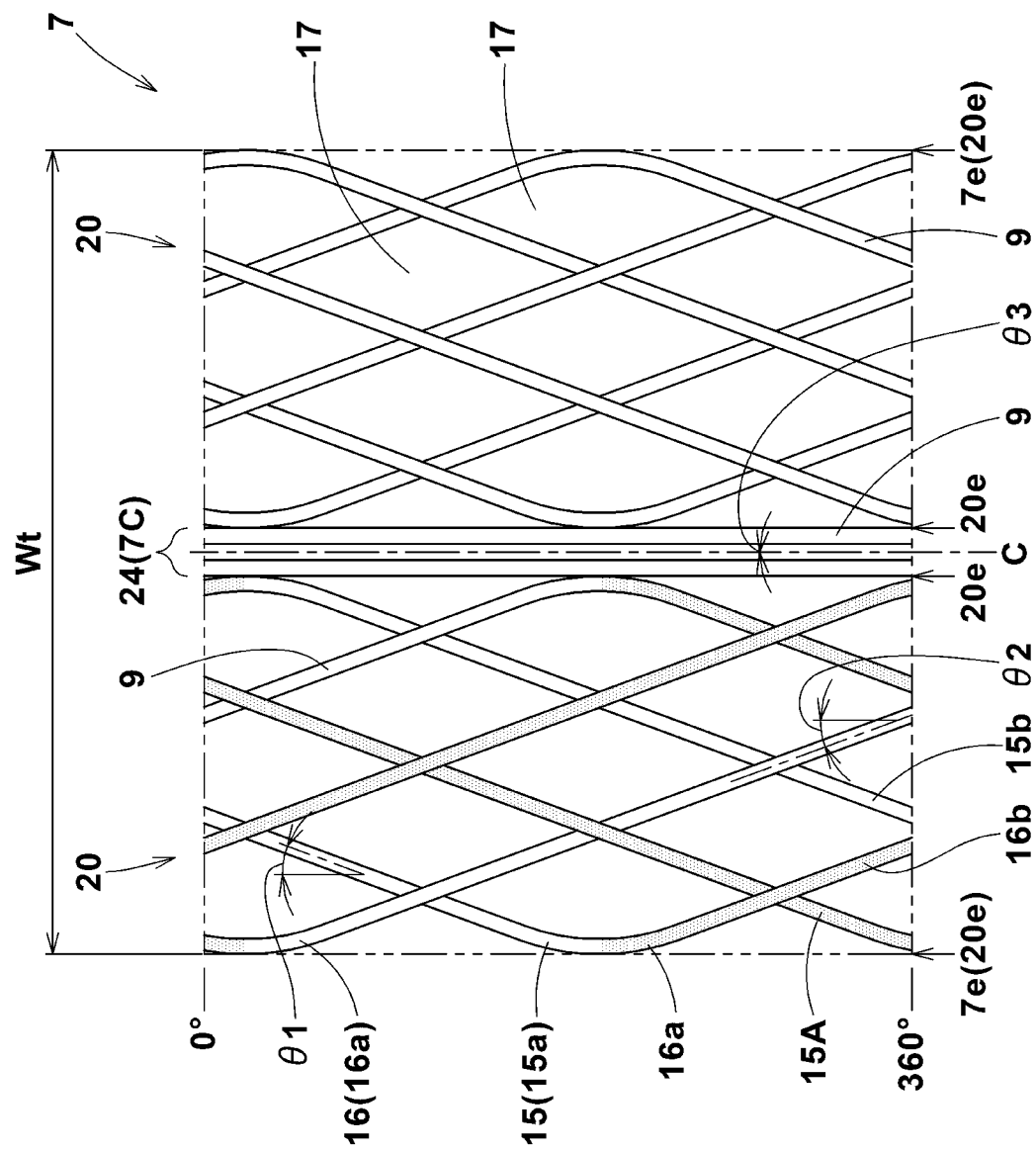
FIG. 5 is a developed view showing another example of the tread reinforcing layer which is scaled down only in the tire circumferential direction.
Figure 6:
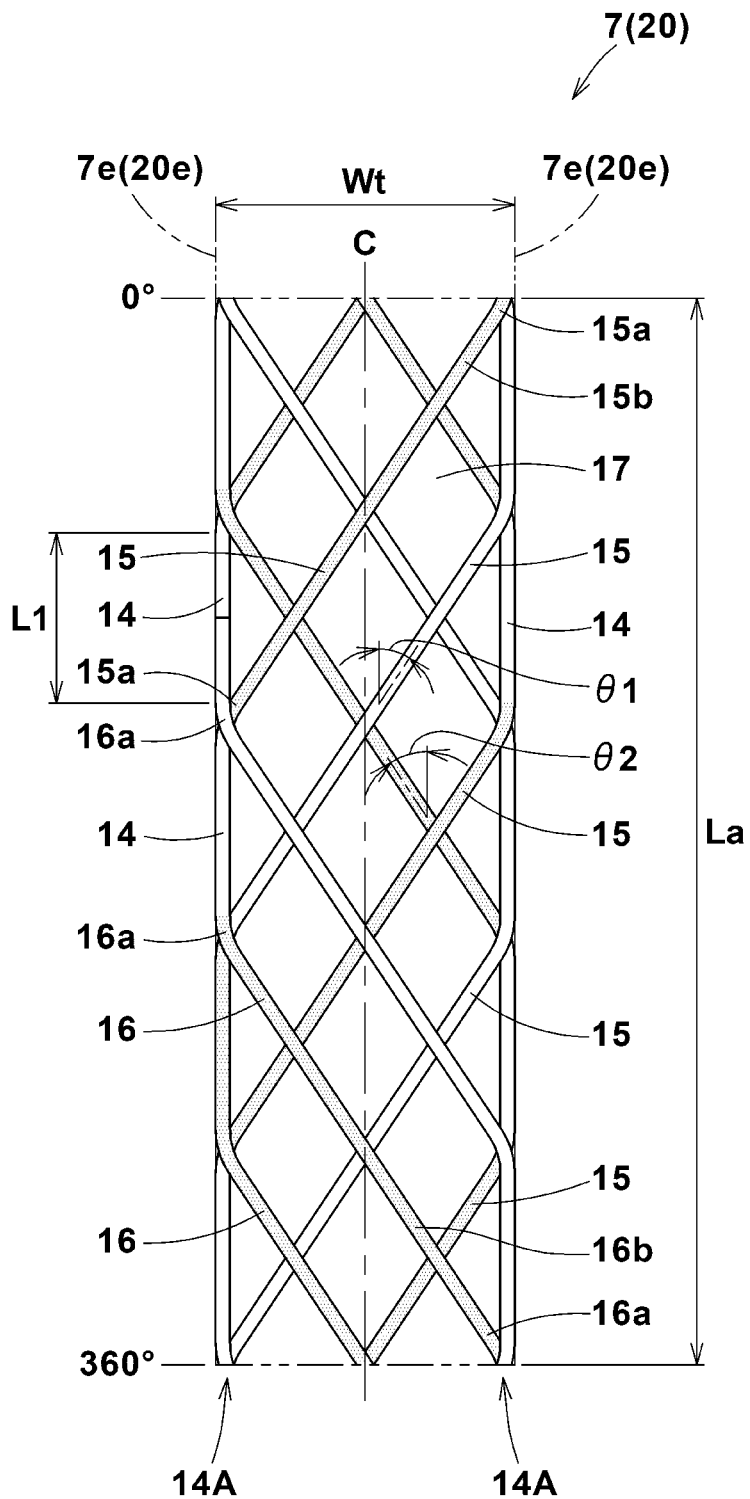
FIG. 6 is a developed view showing a still another example of the tread reinforcing layer which is scaled down only in the tire circumferential direction.

FIG. 3, FIG. 5 and FIG. 6 are developed views of examples of the tread reinforcing layer 7, each showing the entire circumferential length La thereof by scaling down in the tire circumferential direction.

As shown, the tread reinforcing layer 7 (namely, the windings of the tape) comprises oblique segments 13 in which the tape 9 is inclined with respect to the tire circumferential direction, and optionally (in FIG. 3, and FIG. 6) comprises circumferential segments 14 in which the tape 9 extends substantially in parallel with the tire circumferential direction.

The oblique segments 13 include
first oblique segments 15 inclined with respect to the tire circumferential direction toward one side in the tire axial direction (upward to the right in the figure), and
second oblique segments 16 inclined with respect to the tire circumferential direction toward the other side in the tire axial direction (downward to the right in the figure).

In the tread reinforcing layer 7, the oblique segments 13 are arranged such that
the side edges 15s of the adjacent first oblique segments 15 do not contact with each other, and
the side edges 16s of the adjacent second oblique segments 16 do not contact with each other.

Thus, the tread reinforcing layer 7 has a net structure 20 where the first oblique segments 15 and the second oblique segments 16 intersect with each other while forming interspaces 17 therebetween.

Incidentally, in the intersecting portions 18 of the first oblique segments 15 and the second oblique segments 16, they are overlapped in the tire radial direction. Such tread reinforcing layer 7 can increase the bonding strength between the tape 9 and the underlying structure such as the carcass 6 at the intersecting portions 18, so the windings of the tape can be prevented from being disturbed.

Each of the first oblique segments 15 and the second oblique segments 16 is defined as extending from one to the other of the ends 20e in the tire axial direction of the net structure 20.

Each of the first oblique segments 15 includes a first axial outer part 15a of which angle θ1 with respect to the tire circumferential direction decreases toward one of the axial ends 20e of the net structure 20.

Each of the second oblique segments 16 includes a second axial outer part 16a of which angle θ2 with respect to the tire circumferential direction decreases toward the above-said one of the axial ends 20e of the net structure 20.

In the example shown in FIG. 3, the interspaces 17 include those of a rhombic shape and a pentagonal shape. The rhombic interspace 17a is formed with four oblique segments 13. The pentagonal interspace 17b is formed with four oblique segments 13 and one circumferential segment 14.

In the example shown in FIG. 3, the tread reinforcing layer 7 has two first oblique segments 15 and two second oblique segments 16. In FIG. 3, one of the two first oblique segments 15 and one of the two second oblique segments 16 are colored with thin dot pattern for easy recognition.

The first axial outer parts 15a are connected to the second axial outer parts 16a via the circumferential segments 14, therefore, the bending angle of the tape becomes smaller when compared with the case where the first oblique segments 15 are directly connected to the second axial outer parts 16a. Accordingly, the bending stress acting on the reinforcing cords are decreased, and as a result, it becomes possible to prevent the tape 9 from separating from the underlying structure such as the carcass.

Thus, the bonding strength between the tape 9 and the underlying structure is maintained at high level, and the disturbance or disorder of the windings of the tape can be suppressed.

Each of the first oblique segments 15 is provided with the first axial outer parts 15a on both sides in the axial direction of the net structure 20, therefore,
the first oblique segment 15 is made up of the two first axial outer parts 15a and a major part 15b extending therebetween.

Each of the second oblique segments 16 is provided with the second axial outer parts 16a on both sides in the tire axial direction of the net structure 20, therefore, the second oblique segment 16 is made up of the two second axial outer parts 16a and a major part 16b extending therebetween.

The major parts 15b and 16b extend linearly in the developed state of the tread reinforcing layer.
Here, the term "linear" means that variations of the angles θ1 and θ2 of the major parts 15b and 16b with respect to the tire circumferential direction are within +/−5 degrees in the developed state of the tread reinforcing layer.

At both ends 20e in the tire axial direction of the net structure 20, the first axial outer part 15a is connected to the second axial outer part 16a via the circumferential segment 14.

As the tread reinforcing layer 7 in this example is made up of the net structure, the ends 20e of the net structure 20 correspond to the edges 7e in the tire axial direction of the tread reinforcing layer 7.

In the example shown in FIG. 3, the angles θ1 and θ2 of the first axial outer part 15a and the second axial outer part 16a with respect to the tire circumferential direction are continuously changed, and the first axial outer part 15a and the second axial outer part 16a are formed in a circular arc shape.

As a result, the bending stress acting on the reinforcing cords 10 is more effectively reduced.

Figure 4A:
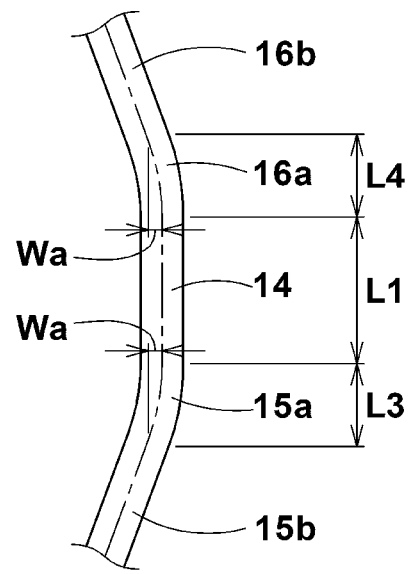
FIG. 4(a) is an enlarged partial view of the tread reinforcing layer of FIG. 3.

FIG. 4(a) shows the bent part of the tape 9 shown in FIG. 3. As shown, the length Wa in the tire axial direction of the first/second axial outer part 15a/16a is preferably set to be smaller than the length Wb in the tire axial direction of the adjacent interspaces 17 (shown in FIG. 3) in order to make it possible to secure a large axial length of the major part 15b/16b, thereby facilitating the winding of the tape 9.

Preferably, the length Wa is not less than 10%, more preferably not less than 20%, but not more than 80%, more preferably not more than 60% of the length Wb. This facilitates the winding of the tape 9 and reduces the bending stress acting on the first/second axial outer parts, so the disturbance or disorder of the windings of the tape 9 is effectively prevented.

The circumferential length L1 of the circumferential segment 14 is preferably not less than 20% and not more than 80% of the sum {(L3+L4)/2+L1} of the circumferential length L1 of the circumferential segments 14, and one half of the sum of the circumferential length L3 of the first axial outer part 15a and the circumferential length L4 of the second axial outer part 16a. This makes it possible to effectively reduce the bending stress acting on the tape 9.

It is preferable that the angle θ1A of the major part 15b of the first oblique segment 15 with respect to the tire circumferential direction is set in a range from 5 to 20 degrees, and the angle θ2A of the major part 16b of the second oblique segment 16 with respect to the tire circumferential direction is set in a range from 5 to 20 degrees.

As a result, the disturbance or disorder of the windings of the tape 9 can be further suppressed. when the angles θ1A and θ2A are less than 5 degrees, as the number of the windings (or length) of the tape 9 increases, there is a possibility that the weight reduction of the tire 1 and workability can not be improved.

The length of each of the major parts 15b and 16b of the first and second oblique segments 15 and 16 is longer than the circumferential length La of the tire reinforcing layer 7 measured at the tire equator C.

Figure 4B:
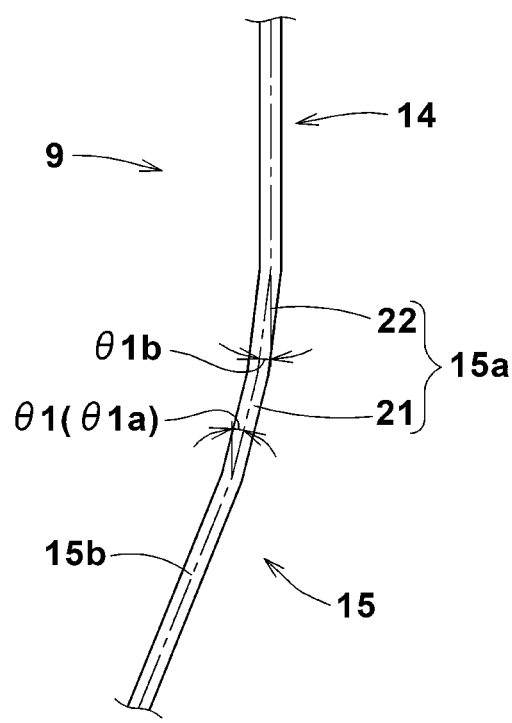
FIG. 4(b) is an enlarged partial view of another example of the first oblique segment.

FIG. 4(b) shows a modification of the bent part shown in FIG. 3. As shown, in this example, the angle θ1 of the first axial outer part 15a of the first oblique segment 15 with respect to the tire circumferential direction is changed stepwise. Also the angle θ2 of the second axial outer part 16a may be changed stepwise.

Such stepwise change also reduces the bending stress acting on the tape 9, thus preventing the disturbance of the windings.

In the example where the angle θ1, θ2 is changed stepwise, the first/second axial outer part 15a/16a can be made up of two or more linear portions having different angles θ1. In the example shown in FIG. 4(b), the first/second axial outer part is made up of a first linear portion 21 inclined with respect to the tire circumferential direction at an angle θ1a smaller than that of the major portion 15b, and a second linear portion 22 inclined with respect to the tire circumferential direction at an angle θ1b smaller than that the first linear portion 21.

In the example shown in FIG. 5, the tread reinforcing layer 7 is composed of a helical structure 24 of the tape 9 wound one turn or two or more turns spirally at an angle θ3 of not more than 5 degrees with respect to the tire circumferential direction, and a pair of net structures 20 similar to the former example disposed on both sides of the helical structure 24.

The two net structures in this example are mirror symmetrical about the tire equator.

The same components as those of the former example of the tread reinforcing layer 7 are denoted by the same reference numerals, and the redundant explanation is omitted.

In the helical structure 24, the tape 9 is inclined with respect to the tire circumferential direction toward one side in the tire axial direction. The helical structure 24 is disposed in a tread crown region 7C including the tire equator C.

Here, the crown region 7C corresponds to the ground contacting patch of the motorcycle tire 1 when the tire is under the above-said normally inflated loaded condition and the camber angle of the tire is zero.

In FIG. 5, each of the net structure 20 is composed of the first oblique segments 15 and the second oblique segments 16 without the circumferential segments 14.

The first oblique segment 15 includes the first axial outer parts 15a of which angle θ1 is decreased toward the respective ends 20e of the net structure 20.

The second oblique segment 16 includes the second axial outer parts 16a of which angle θ2 is decreased toward the respective ends 20e of the net structure 20.

In this example, unsimilarly to the former example, the first axial outer part 15a is directly connected to the second axial outer part 16a. In this example as well, as the bending angle of the tape becomes smaller, the bending stress acting on the tape 9 becomes small, and the bonding strength between the tape 9 and the underlying structure such as the carcass 6 can be maintained at high level.

In this example, too, each of the net structures 20 has two first oblique segments 15 and two second oblique segments 16. In FIG. 5, one of the two first oblique segments 15 and one of the two second oblique segments 16 of only the left-hand net structures 20 are colored with thin dot pattern for easy recognition.

In this example, each of the first oblique segments 15 is made up of the two first axial outer parts 15a and the major part 15b extending therebetween, and each of the second oblique segments 16 is made up of the two second axial outer parts 16a and the major part 16b extending therebetween.

In this example, the angles θ1 and θ2 with respect to the tire circumferential direction of the first axial outer part 15a and the second axial outer part 16a are continuously varied. In this example, each of the first axial outer part 15a and the second axial outer part 16a is formed in an arc shape.

In this example, too, the angles θ1 and θ2 of the first axial outer part 15a and the second axial outer part 16a may be changed stepwise as shown in FIG. 4(b).

In this example, the edges 7e of the tread reinforcing layer 7 are formed by the axially outer edges 20e of the respective net structures 20.

In the example shown in FIG. 6, the tread reinforcing layer 7 is composed of one net structure 20 made up of the first oblique segments 15, the second oblique segments 16 and the circumferential segments 14. In this example, both edges 20e of the net structure 20 form the edges 7e of the tread reinforcing layer 7.

The tread reinforcing layer 7 shown in FIG. 6 has five first oblique segments 15 and five second oblique segments 16. In FIG. 6, three of the six first oblique segments 15 and three of the six second oblique segments 16 are colored with thin dot pattern for easy recognition.

Incidentally, the first oblique segments 15 and the second oblique segments 16 are not limited to such numbers.

Each of the first oblique segments 15 includes the first axial outer parts 15a on both sides in the tire axial direction of the net structure 20, and the first oblique segment 15 is made up of the two first axial outer parts 15a, and the major part 15b extending therebetween.

Each of the second oblique segments 16 includes the second axial outer parts 16a on both sides in the tire axial direction of the net structure 20, and the second oblique segments 16 is made up of the two second axial outer parts 16a, the major part 16b extending therebetween.

In the net structure 20 shown in FIG. 6, on each side (at the edge 20e) of the net structure 20, the circumferential segments 14 are arranged so as to continue in the tire circumferential direction, namely, the net structure 20 has a circumferentially linearly continuous part 14A. In other words, the first axial outer part 15a of the circumferential segment 14 overlaps with the adjacent circumferential segment 14 or the adjacent second axial outer part 16a, and the second axial outer part 16a of the circumferential segment 14 overlaps with the adjacent circumferential segment 14 or the adjacent first axial outer part 15a.

As a result, the bonding strength between the tape 9 and the underlying structure such as the carcass 6 can be increased, so the disturbance of the windings can be prevented.

It is preferable that the circumferential segments 14 have a length L1 which is 1/N times the circumferential length La of the tire reinforcing layer 7 measured at the axial position of the circumferential segments 14, wherein N is the number of the first oblique segments 15 at the above-said axial position.

Such circumferential segments 14 can further enhance the bonding strength between the tape 9 and the underlying structure such as the carcass 6, so the disturbance of the windings is prevented. In the example shown in FIG. 6, since the number N of the first oblique segments 15 on each side is 5, a preferable length L1 14 is ⅕ times the circumference La of the tire.

In the case where the net structure 20 is formed from a single tape 9 wound, and the number N of the first oblique segments 15 is an odd number, the length L1 of the circumferential segments 14 can be set to exactly 1/N times the circumference La of the tire at the axial position of the circumferential segments 14.

Next, a method for manufacturing the tire 1 will be described.

Figure 7:
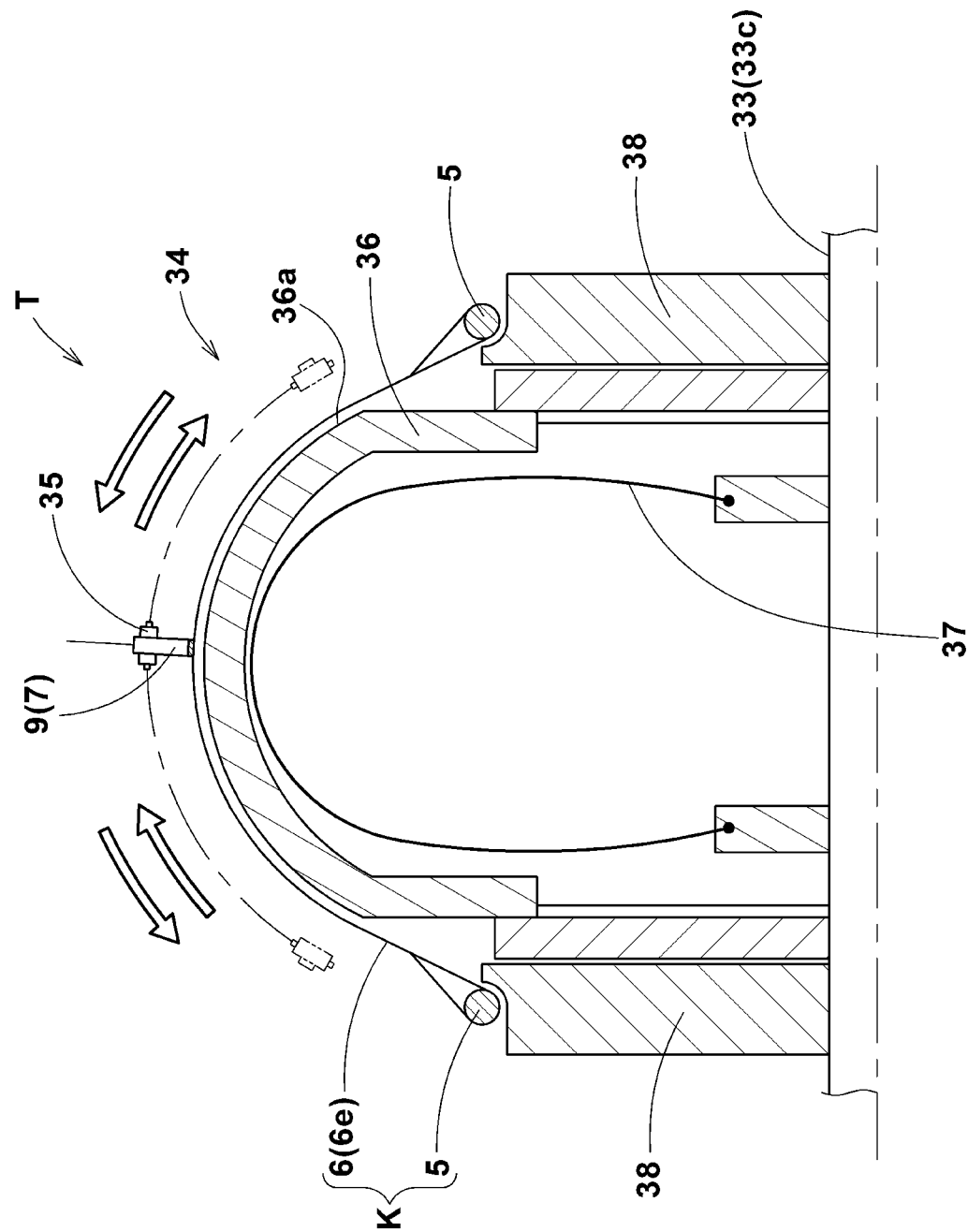
FIG. 7 is a schematic cross sectional view showing an apparatus for manufacturing the tread reinforcing layer.

FIG. 7 shows an apparatus T for manufacturing the tread reinforcing layer 7 used in the method for manufacturing the tire 1.

The apparatus T in this example comprises a base 33, a drum 34 rotatably supported by the base 33, and an applicator 35 for supplying the tape 9 to the drum 34.

The base 33 has a rotary shaft 33c that rotatably support the drum 34. Further, the base 33 comprises a power transmission device for rotating the rotary shaft 33c, and a control device (not shown) for controlling the rotation thereof.

The drum 34 comprises: an annular core body 36 whose outer circumferential surface 36a has a profile which is approximate to that of the tread surface 2a of the tire 1; a device 37 for expanding and contracting the core body 36 inwardly and outwardly in the tire radial direction; and a device 38 for holding an unvulcanized tire base body K including the bead cores 5.

In this example, the unvulcanized tape 9 is wound around on the unvulcanized tire base body K.

The applicator 35 comprises a conveyor conveying the tape 9 on its conveying surface to the drum 34.

On the upstream side of the applicator 35, an extruder for continuously extruding unvulcanized rubber for the tape 9 is provided (not shown).

The applicator 35 is supported by, for example, a three-dimensionally moving device (not shown) capable of reciprocating in the axial direction and the radial direction with respect to the drum 34.

A method of manufacturing the tire 1 as an embodiment of the present invention comprises a preparing step of preparing an unvulcanized tire base body K, and a forming step of forming the tread reinforcing layer 7.

The forming step includes a winding step of winding the unvulcanized tape 9 around on a surface 6e which is, in this example, the radially outer surface of the carcass 6 of the unvulcanized tire base body K.

In this winding step, it is desirable that the conveying surface of the applicator 35 is kept in parallel with the surface 6e or the outer circumferential surface 36a of the core 36 around which the unvulcanized tape 9 is wound.

The winding step in this example comprises a first winding process, a parallel winding process, and a second winding process.

The first winding process is for forming the first oblique segment 15. The second winding process is for forming the second oblique segment 16. The parallel winding process if for forming the circumferential segment 14.

Hereinafter, a method of manufacturing the tread reinforcing layer 7 shown in FIG. 3 will be described.

In this example, the winding step is performed in two cycles, one cycle comprising at least the first winding process and the second winding process.

Incidentally, the winding step is not limited to two cycles, and may be performed in three or more cycles.

Figure 8A:
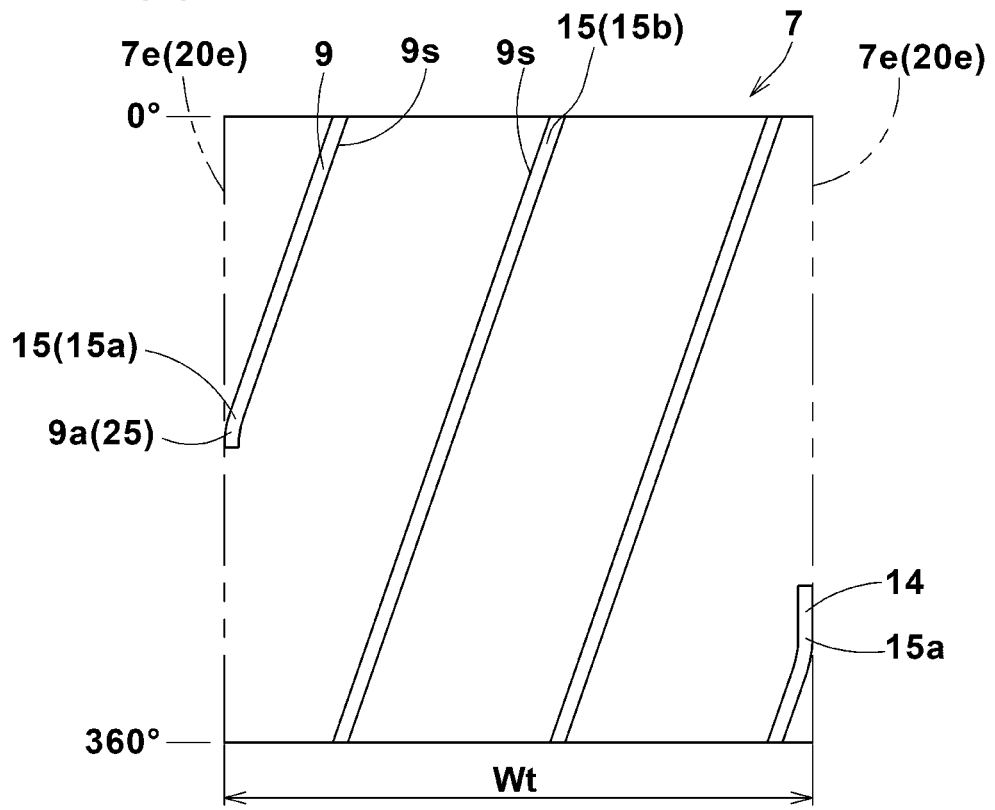
FIGS. 8(a), 8(b), 9(a) and 9(b) are developed views showing windings of the tape for explaining the processes of manufacturing the tread reinforcing layer.
Figure 8B:
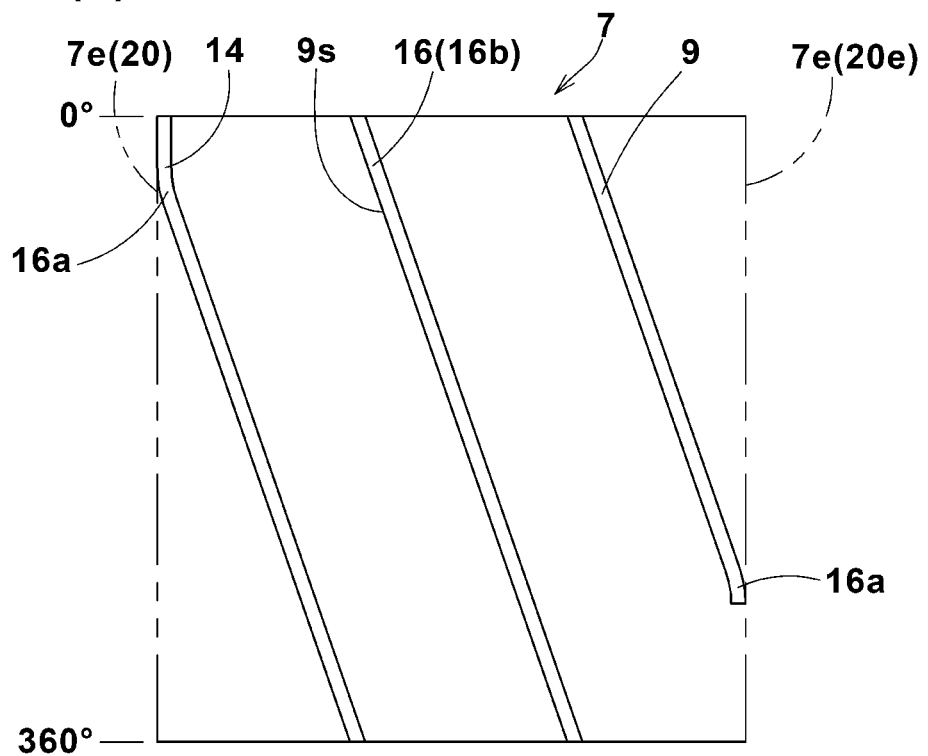

FIGS. 8(a) and 8(b) are developed views conceptually showing windings or turns of the tape wound in the first cycle of the winding process.

Figure 9A:
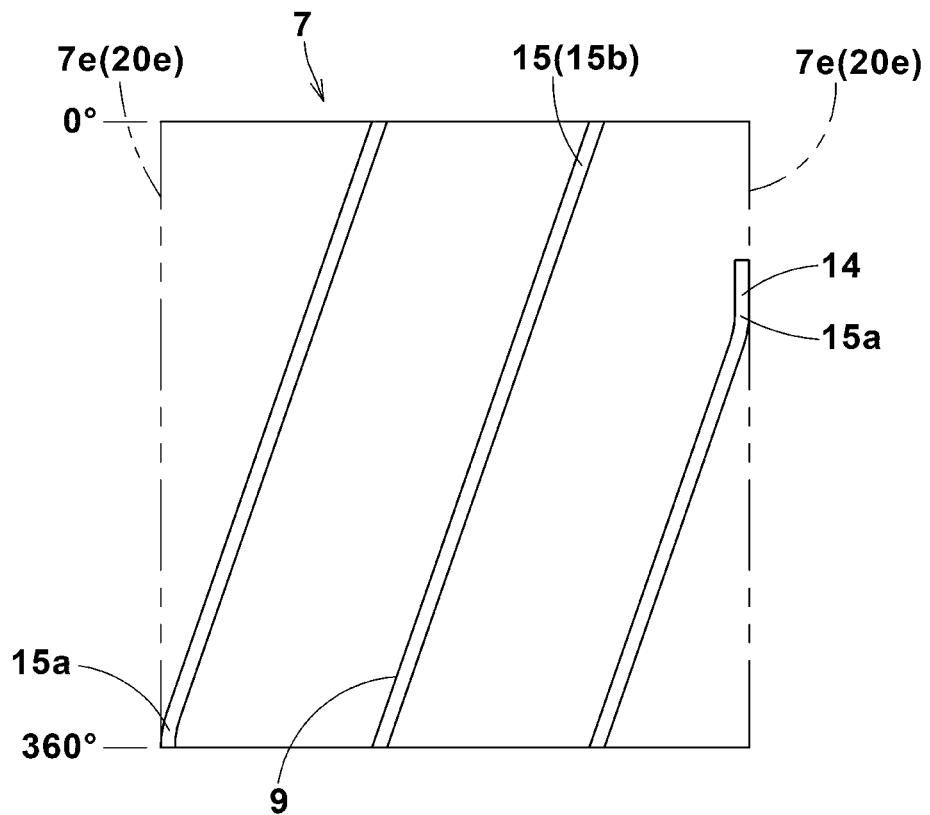
Figure 9B:
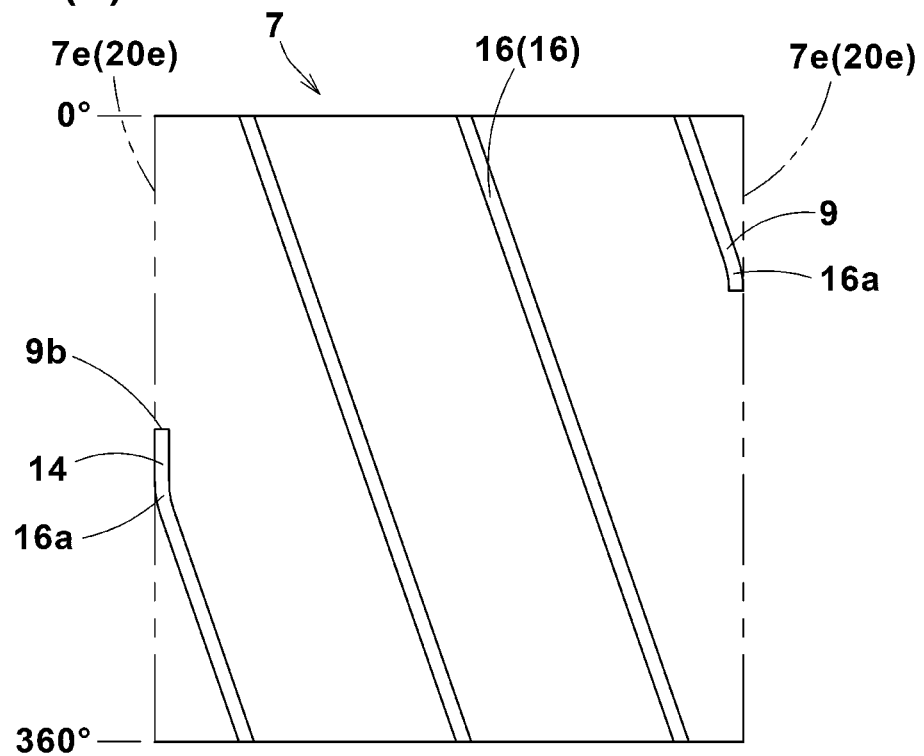

FIGS. 9(a) and 9(b) are developed views conceptually showing windings or turns of the tape wound in the second cycle of the winding process.

As shown in FIG. 8(a), in the first cycle of the winding step, a cut end 9a (hereinafter the winding start end 9a) of the tape 9 guided by the applicator 35 is attached to the above-said surface 6e at a position corresponding to the above-said one end 20e of the net structure 20.

In this case, the winding start end 9a forms the outer end 25 in the tire axial direction of the first axial outer part 15a of one of the first oblique segments 15.

Next, the drum 34 is rotated, and at the same time, the applicator 35 is moved toward the other end 20e of the net structure 20 from the one end 20e (from the left side to the right side in the figure).

At this time, by controlling the moving speed in the tire axial direction of the applicator 35 and/or the rotational speed of the drum 34, the first axial outer part 15a and the major part 15b are formed.

In this example, the rotational speed of the drum 34 is kept constant from the winding start end 9a to the winding stop end 9b (FIG. 9b) of the tape 9, and accordingly, the moving speed of the applicator 35 is changed.

In this example, the tape 9 is helically wound so that the side edges 9s of the tape do not come into contact with each other in the windings or turns.

The first axial outer part 15a on the one end 20e side is formed by gradually increasing the moving speed of the applicator 35 toward the other end 20e.

In this example, the moving speed of the applicator 35 is continuously increased. In another example, the moving speed of the applicator 35 is increased stepwise.

The major part 15b is formed by moving the applicator 35 at a constant speed corresponding to the maximum moving speed of the applicator 35.

The first axial outer part 15a on the other end 20e side is formed by gradually decreasing the moving speed of the applicator 35 from the maximum moving speed for forming the major part 15b.

In this example, the moving speed is continuously decreased. In another example, the moving speed of the applicator 35 is decreased stepwise.

Next, the parallel winding process in the first cycle of the winding step is performed. In this parallel winding process, while the drum 34 is rotated, the applicator 35 is stopped (namely, the moving speed is 0) at the other end 20e of the net structure 20, and thereby the circumferential segment 14 is formed.

In the manufacturing method according to the present invention, the moving speed of the applicator 35 is gradually decreased to zero at the ends 20e of the net structure 20. Therefore, in comparison with the case where the moving speed is abruptly changed to zero, impact applied to the applicator 35 is reduced, and disturbance of the windings caused thereby can be prevented.

Next, as shown in FIG. 8(b), the second winding process in the first cycle of the winding step is performed.

In the second winding process, the applicator 35 is moved from the other end 20e to the one end 20e.

In the second winding process in this example, the second axial outer part 16a on the one end 20e side, the major part 16b, and the second axial outer part 16a on the other end 20e side of the above-said one of the second oblique segments 16 are formed in this order.

In this example, the tape 9 is helically wound so that the side edges 9s of the tape do not come into contact with each other in the windings or turns.

The second axial outer part 16a on the other end 20e side is formed by gradually increasing the moving speed of the applicator 35. In this example, the moving speed is continuously increased. In another example, the moving speed is increased stepwise.

The major part 16b is formed by moving the applicator 35 at a constant speed corresponding to the maximum moving speed of the applicator 35.

The second axial outer part 16a on the one end 20e side is formed by gradually decreasing the moving speed of the applicator 35 from that for the major part 16b.

In this example, the moving speed is continuously decreased. In another example, the moving speed is decreased stepwise.

Next, the parallel winding process in the first cycle of the winding step is performed. In the parallel winding process, while the drum 34 is rotated, the applicator 35 is stopped at the one end 20e.

In this example, as described above, the first cycle of the winding step comprises the first winding process, the parallel winding process, the second winding process, and the parallel winding process which are performed sequentially, as shown in FIGS. 8(a) and 8(b).

Next, the second cycle of the winding step is performed.

As shown in FIG. 9(a), the first winding process and the parallel winding process in the second cycle are performed, and then as shown in FIG. 9(b), the second winding process and the parallel winding process in the second cycle are performed.

In the second cycle, too, the rotational speed of the drum 34 and the moving speed of the applicator 35 are controlled similarly to the first cycle, In this example, the other cut end (winding stop end) 9b of the tape 9 is attached to the above-said surface 6e at a position corresponding to the above-said other end 20e of the net structure 20, and connected to the winding start end 9a.

In this example, as shown in FIGS. 9(a) and 9(b), the second cycle of the winding step comprises the first winding process, the parallel winding process, the second winding process, and the parallel winding process which are performed sequentially.

Namely, one cycle of the winding step comprises the first winding process, the parallel winding process, the second winding process, and the parallel winding process which are performed sequentially.

In this way, according to the manufacturing method in this example, the net structure 20, which is made up of two first oblique segments 15, two second oblique segments 16, and four circumferential segments 14 as shown in FIG. 3, is formed by the single continuous tape 9.

In this example, in order to form the tread reinforcing layer 7, one continuous tape 9 is used. But, the tread reinforcing layer 7 may be formed with two or more tapes 9.

While detailed description has been made of preferable embodiments of the present invention, the present invention can be embodied in various forms without being limited to the illustrated embodiments.

Comparison Tests

Based on the tread reinforcing layer shown in FIG. 3, test tires (motorcycle tires) having the internal structure shown in FIG. 1 were experimentally manufactured and tested for the cornering performance, and during forming the tread reinforcing layers, the disturbance or disorder of the windings of the tape was checked.

The specifications of the tread reinforcing layers of the test tires are shown in Table 1. In Table 1, the values of the circumferential length La are those at the axial position of the circumferential segments. Common specifications are as follows.

Tape: Width 4.0 mm, Thickness 1.0 mm width wt of Tread reinforcing layer: 85% of TW <Winding Disturbance Test>

The tread reinforcing layers of the test tires were formed by the apparatus T shown in FIG. 7, and the state of disturbance or disorder of the windings of the tape was visually checked and evaluated by the operator.

The results are indicated in Table 1 by an index based on Comparative Example Ref1 being 100, wherein the larger the numerical value, the lesser or better the disturbance.

<Cornering Performance Test>

Cornering performance was evaluated by a test rider based on handle stability, grip force, maneuverability, etc. while a 1300 cc motorcycle was running on a dry asphalt road surface of a test course. The test tire (size 120/70ZR17, inflation pressure 250 kPa) was mounted on the front wheel (rim size 17M/CxMT3.50) of the motorcycle, on the rear wheel (rim size 17M/CxMT5.50) of which an identical tire (size 180/55ZR17, inflation pressure 290 kPa) was mounted. The results are indicated in Table 1 by an index based on Comparative Example Ref1 being 100, wherein the larger the numerical value, the better the cornering performance.

TABLE 1

| | Tire | | | | | | |
|---|---|---|---|---|---|---|---|
| | Ref1 | Ex1 | Ex2 | Ex3 | Ex4 | Ex5 | Ex6 |
| first and second axial outer parts | absent | present | present | present | present | present | present |
| {(L3 + L4)/2 + L1}/La × 360 (degree) | 20 | 20 | 20 | 20 | 20 | 10 | 5 |
| L1/{(L3 + L4)/2 + L1} (%) | 100 | 80 | 50 | 20 | — | 80 | 80 |
| Wa/Wb (%) | — | 20 | 50 | 80 | 90 | 20 | 20 |
| angles θ1A, θ2A of major parts (deg.) | 7 | 7 | 7 | 7 | 7 | 7 | 7 |
| disturbance | 100 | 115 | 120 | 120 | 120 | 120 | 125 |
| cornering performance | 100 | 120 | 110 | 110 | 105 | 115 | 105 |

From the test results, it was confirmed that the tires according to the present invention were improved in the cornering performance by effectively suppressing the disturbance of the windings of the tape.

DESCRIPTION OF THE REFERENCE SIGNS 1 pneumatic tire
7 tread reinforcing layer
9 tape
14 circumferential segment
15 first oblique segment
15a first axial outer part
16 second oblique segment
16a second axial outer part
17 interspace
20 net structure
20e one end

The invention claimed is:

1. A pneumatic tire comprising:
a tread portion having a radially outer surface defining the tread,
a pair of sidewall portions,
a pair of bead portions,
a carcass extending between the bead portions through the tread portion and the sidewall portions, and
a tread reinforcing layer disposed radially outside the carcass in the tread portion, and comprising a net structure formed from a tape of rubber in which a single reinforcing cord or plural reinforcing cords are embedded along the length of the tape,
wherein
the net structure comprises
first oblique segments in which the tape is inclined with respect to the tire circumferential direction to one side in the tire axial direction, and
second oblique segments in which the tape is inclined with respect to the tire circumferential direction to the other side in the tire axial direction,
side edges of the first oblique segments do not contact with each other,
side edges of the second oblique segments do not contact with each other, and
the first oblique segments and the second oblique segments intersect with each other, forming interspaces therebetween,
wherein
each of the first oblique segments has a first axial outer part in which the angle of the tape with respect to the tire circumferential direction decreases toward one end in the tire axial direction of the net structure,
each of the second oblique segments has a second axial outer part in which the angle of the tape with respect to the tire circumferential direction decreases toward said one end in the tire axial direction of the net structure, and
said first axial outer part is directly connected to said second axial outer part,
said each of the first oblique segments has another first axial outer part in which the angle of the tape with respect to the tire circumferential direction decreases toward the other end in the tire axial direction of the net structure,
said each of the second oblique segments has another second axial outer part in which the angle of the tape with respect to the tire circumferential direction decreases toward said other end in the tire axial direction of the net structure,
said another first axial outer part is directly connected to said another second axial outer part,
said each of the first oblique segments is made up of said a first axial outer part, said another first axial outer part and a first in-between part extending linearly therebetween, and
said each of the second oblique segments is made up of said a second axial outer part, said another second axial outer part and a second in-between part extending linearly therebetween,
the axial length of each of said a first axial outer part and said another first axial outer part is smaller than an axial length of one of the interspaces which is adjacent thereto, and
the axial length of each of said a second axial outer part and said another second axial outer part is smaller than an axial length of one of the interspaces which is adjacent thereto.

2. The pneumatic tire according to claim 1, wherein in each of said first axial outer part, said another first axial outer part, said second axial outer part and said another second axial outer part, the angle of the tape is changed stepwise.

3. The pneumatic tire according to claim 1, wherein in each of said first axial outer part, said another first axial outer part, said second axial outer part and said another second axial outer part, the angle of the tape is continuously changed.

4. The pneumatic tire according to claim 1, which is a motorcycle tire in which the tread portion is convexly curved so that the maximum cross sectional width of the tire occurs between the tread edges.

5. The pneumatic tire according to claim 4, wherein the tread reinforcing layer comprises said net structure disposed on each side of the tire equator.

6. The pneumatic tire according to claim 5, wherein the tread reinforcing layer further comprises a helical structure between the two net structures in which the tape is wound spirally at an angle of not more than 5 degrees with respect to the tire circumferential direction.

7. The pneumatic tire according to claim 1, wherein the tread reinforcing layer comprises said net structure disposed on each side of the tire equator.

8. The pneumatic tire according to claim 7, wherein the tread reinforcing layer further comprises a helical structure between the two net structures in which the tape is wound spirally at an angle of not more than 5 degrees with respect to the tire circumferential direction.

\* \* \* \* \*